Aug. 12, 1930.  A. B. CADMAN  1,772,855
VEHICLE BRAKE
Filed Sept. 26, 1927
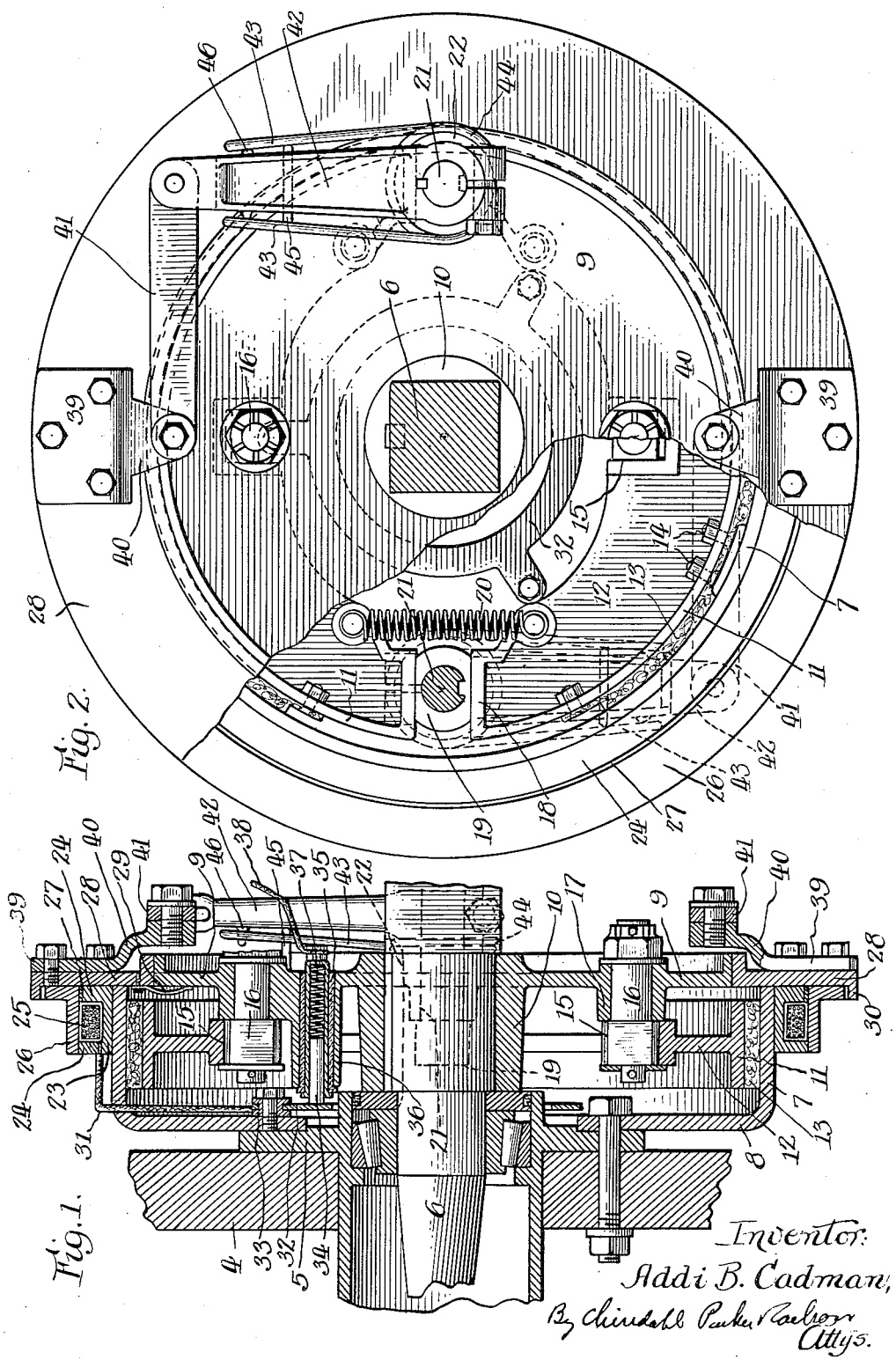
Inventor:
Addi B. Cadman,
By Churchill Parker Carlson
Attys.

Patented Aug. 12, 1930

1,772,855

UNITED STATES PATENT OFFICE

ADDI BENJAMIN CADMAN, OF BELOIT, WISCONSIN, ASSIGNOR, BY MESNE ASSIGNMENTS, TO WARNER ELECTRIC BRAKE CORPORATION, OF SOUTH BELOIT, ILLINOIS, A CORPORATION OF ILLINOIS

VEHICLE BRAKE

Application filed September 26, 1927. Serial No. 221,904.

My invention relates to improvements in vehicle brakes and more particularly to brakes of the class wherein the braking force is derived from the momentum of the moving vehicle.

One object of the invention is to provide a new and improved vehicle brake of the internal shoe type wherein the braking force derived from the momentum of the vehicle is applied through the medium of the electromagnetic friction clutch to the plurality of expanding devices, each associated with the opposed ends of a pair of brake shoes.

Another object of the invention is to provide a novel vehicle brake in which forces derived from the momentum of the vehicle are applied as a mechanical couple to the gripping elements of the brake.

A further object is to provide, in combination with a momentum brake having a friction clutch and a torque multiplying connection for applying the braking force derived from the movement of the vehicle in either direction, a novel means by which the operating elements of said clutch and connection are normally retained in brake releasing position.

Other objects and advantages of the invention will become apparent from the following detailed description taken in connection with the accompanying drawings in which:

Fig. 1 is a fragmentary view of a vehicle wheel equipped with a brake embodying the features of my invention, the brake being shown in vertical section.

Fig. 2 is an elevational view taken from the right hand side of Fig. 1 with part of the enclosing brake casing broken away to show the internal parts of the brake, the external operating parts for this portion of the brake being shown in phantom.

While the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

In the drawings the invention is embodied in a so-called internal shoe type of brake for arresting or controlling the motion of a vehicle wheel 4. The hub portion 5 of the wheel is rotatably mounted in the usual way on bearings carried on the end of an axle 6 which, in the present instance, is stationarily mounted with respect to the vehicle chassis.

Mounted on the inner side of the wheel 4 so as to rotate therewith is a revoluble member in the form of the drum 7 having an internal braking surface disposed in concentric relation to the wheel axis. The outer end of the drum is closed by an inturned flange 8 which may be bolted to the hub 5 of the wheel. The inner or open end of the drum is closed by a substantially flat disk member or casing 9 received on the axle 6 and firmly held against rotation, this being accomplished herein by keying an integral hub portion 10 of the casing to the axle.

The gripping elements or shoes employed for frictionally engaging the internal drum surface to effect the braking action may be of any preferred construction, the ones herein illustrated being segmental in form and comprising an arcuate backing portion 11 reinforced by an internal rib 12. Preferably a covering comprising a series of blocks 13 of suitable brake material is secured to each shoe as by bolts 14. Because of the enormous braking force available with the present power brake, the shoe coverings may be made of metal or other material having a lower friction coefficient but greater resistance to wear than the ordinary fabric brake linings which must necessarily be used in brakes wherein physical power of the vehicle driver is the source of the braking force. A covering material known to the trade as "brake block" and having substantially the same friction properties as steel but more resistant to wear has been found to give the desired results with the present type of brake.

The brake shoes are arranged in end to end relation within the drum and firmly held against rotation at the same time being freely expansible. To provide such a mounting, the rib 12 of each shoe is formed intermediate its end with a radially extending flanged recess 15 which fits over the squared inner end of a short stud 16 extending parallel to the drum axis. The studs 16 are firmly clamped in apertured bosses 17 formed on the casing 9 in diametrically opposed relation.

Both of the shoes have webs 18 formed at their ends which provide opposed bearing surfaces separated by cam blocks 19, the oscillation of which causes expansion of the shoes. In their preferred form, the cams have substantially flat parallel sides against which the webbed ends of the shoes are normally held when the cams are in brake-releasing position (Fig. 2), such relation of the shoes relative to the cams being maintained by tension springs 20 whose opposite ends are anchored to the opposing brake shoes near the ends thereof. The cams 19 are keyed or otherwise rigidly secured upon the ends of the rock shafts 21 journaled intermediate their ends in bosses 22 which are formed on diametrically opposed sides of the casing 9 and which project into the drum. With the arrangement just described, it will be apparent that the brake shoes are freely supported within the drum and out of contact therewith. Expansion of the shoes in braking engagement with the internal drum surface may be effected by oscillating either or both of the rock shafts 21 in either direction.

In order to equalize the wear on the shoe coverings 13 and evenly distribute the strain on the operating parts during application of the brakes, it is preferable to actuate both of the rock shafts simultaneously. Power for thus setting the brake is derived from the kinetic energy of the vehicle when in motion, and the application of such power to the expanding cams is effected through the medium of an efficient electromagnetic friction clutch and powerful torque multiplying mechanisms connecting the clutch and rock shafts 21. The clutch is of a construction suitable for operation by a suitable source of electrical current of relatively low capacity such as the storage battery commonly provided on present day automotive vehicles, and in its preferred form comprises annular driving and driven elements of substantially the same diameter as the drum and mounted for relative axial movement into frictional engagement with each other upon energization of an electromagnet. Herein the driving element of the clutch constitutes the core of the electromagnet. For convenience in manufacture, this element is formed in two parts, including an annular magnet ring 23 formed integral with or otherwise rigidly secured around the outer peripheral surface of the drum and having two flanges 24, one of which is made slightly shorter than the other and positioned adjacent the edge of the drum so as to constitute one magnet pole. A plurality of turns of wire constituting a coil 25 are wound around the groove defined by the flanges 24 and enclosed by an outer magnet ring 26 of L-shaped cross section. This ring is shrunk onto the inner ring with its flange, which constitutes the other magnet pole, disposed in the same plane as the short flange 24 from which it is separated by a ring 27 of non-magnetic material. The magnet thus formed has its pole faces concentrically arranged in a plane perpendicular to the axis of the drum.

In the present embodiment the driven clutch element constitutes the armature of the electromagnet and comprises a metal ring 28 mounted for a slight axial movement toward and from the pole faces of the magnet and also for oscillatory movement. To this end the inner flange edge of the ring is rotatably mounted on the flanged periphery of the casing 9 and is held continuously in yielding contact with the pole faces by one or more leaf springs 29 anchored at one end on the ring and bearing at the other end against the internal surface of the casing 9. The purpose of providing the spring means to hold a portion of the clutch element continuously in contact with the magnetic core is to avoid the existence of an air gap between the clutch elements which would materially reduce the effective pull of this otherwise efficient type of magnet. An outer flange 30 is formed on the ring 28 to exclude dust and dirt from the clutch surfaces.

The coil 25 is intended to be energized by a storage battery (not shown) on the vehicle under the control of a suitable rheostat. One electric connection between the battery and the coil may be through a grounded conductor including the brake drum 7, the axle 6 and the vehicle frame. The other conductor is insulated from the metallic parts of the vehicle and includes a wire 31 extending into the drum 7 and connecting a terminal end of the coil 25 with a collector ring 32 mounted on insulating blocks 33 which are secured to the drum flange 8 on the inner side thereof. This ring is continuously engaged by a brush 34 of carbon or other suitable material mounted in an insulating tube 35 in a boss 36 and pressed inwardly by a spring 37. The energizing circuit is completed through a flexible conducting wire 38 connected to the brush support.

The actuating force for expanding the brake shoes which results from movement of the driven clutch element is applied to the rock shafts 21 as a mechanical couple of forces. To this end a pair of brackets 39, each having an inwardly extending radial arm 40, are secured to the ring 28 on opposite sides of the axle and on a diameter which is perpendicular to the diameter through the axes of the rock shafts 21. The inner end of each bracket arm 40 is pivotally connected to one end of a rigid link 41 the other end of which is pivotally secured to the free end of a crank arm 42 fast upon one rock shaft 21 outside of the casing 9. Normally, that is, when the cams are in brake-releasing position, as indicated in Fig. 2, the crank arms 42 extend parallel to each other in opposite directions and parallel to the longitudinal center lines of the bracket arms 40. The crank arms are of such length that the distance between their outer ends and a diameter through their axes is substantially equal to the distance of the inner ends of the arms 40 from the same diameter. Thus the effective moment arm of each of the two forces constituting the mechanical couple and applied to the rock shafts 21 is equal to the radial distance between the drum axis and the center of gravity of the armature ring 28. In practice this arrangement gives a leverage multiplication of about 16 to 1, that is to say, the frictional force derived from the clutch element is increased in that ratio when applied to the expanding shoes. By providing the inwardly extending bracket arms 40, a maximum moment arm is obtained without the use of longer crank arms 42. Thus the parts of the torque multiplying connections are compactly arranged within the circumference of the armature ring 28 and at such distance from the drum axis as not to be interfered with in their operation by the axle, the anchoring studs 16 or the shoes of the steering knuckle in case the brake is applied to a front vehicle wheel.

The operation of the clutch and the torque multiplying connections in setting the brake will now be described, assuming that the vehicle is moving in a direction to cause the drum rotate in a clockwise direction. When it is desired to apply the brake the driver of the vehicle operates a rheostat to connect the coil 25 to a source of current. Energization of the coil sets up a flux in the core rings 23 and 26 whose pole faces attract the armature thereby drawing all portions of the armature into firm frictional engagement with the pole faces. The ring 28 thus being attached to the rotating drum is oscillated in the direction of rotation of the drum, such motion being effected to oscillate both crank arms 42 outwardly away from the axle, thereby oscillating the cams 19 to move the shoes bodily into braking engagement with the drum. When the shoes have been expanded to a point where the reaction of the drum thereon is sufficient to overcome the frictional force tending to hold the clutch elements together, the armature ring will slip relative to the drum and thus remain stationary in brake-setting position until the magnet is deenergized after the wheel has stopped or its motion sufficiently checked. It will be seen that the frictional force between the clutch element and therefore the braking force applied in expanding the shoes is directly proportional to the energizing current in the coil 25 which can be conveniently controlled.

When the drum is rotating in the reverse or counterclockwise direction the clutch operates in the manner just described but oscillates the cranks 42 inwardly.

Means is provided for completely returning the parts in the clutch to brake-releasing or normal position when the magnet coil is deenergized. This is rendered desirable because of frictional contact between the clutch elements due to the springs 29 and to the residual magnetism ordinarily present after deenergization of the magnet coil. Such frictional force tends to rotate the ring 28, and when multiplied through the leverage used herein, is sufficient to hold the brake shoes partially set. In the present instance, the means employed to prevent such dragging of the brakes comprises two spring elements 43 each acting on the crank arms 42 and operating to oscillate the cranks from either of their two brake-setting positions back to brake-releasing position. Each pair of spring elements extends along the cranks 42 and constitute the arms of a hair pin spring having a coiled portion 44 encircling one of the bosses 22 between the casing 9 and the corresponding crank arm. When the cranks are in brake-releasing position, the outer ends of the spring element bear against the opposite sides of an outwardly extending lug 45 on the casing 9 and an inwardly extending lug 46 on one crank arm 42. Upon oscillation of the cranks 42 in either direction to set the brakes, one arm of each spring will be held stationary by the lug 45 while the other will be moved by the lug 46 and thus further stressed. Then when the coil 25 is deenergized, the latter arm applies to the crank a force sufficient to oscillate the armature ring 28 and the cam blocks 19 back to normal position. The lug 45, it will be observed, constitutes a stop for limiting the movement of each spring arm under its initial stress, and since the springs act in opposed relation, the crank arms will always be held in brake-releasing position when the coil is deenergized. It will be observed that the forces exerted by the spring arms act substantially perpendicular to the center line of the crank 42 and at points close to the ends of the cranks. Thus in returning the expanding cams to normal position, the springs act with instead of against the leverage of the torque multiplying connections. When acting with such relatively large momentum arms, the forces applied by the springs are capable of effectually overcoming the frictional force tending to oscillate the ring 28 or hold it in actuated position after deenergization of the magnet.

It will be observed that by actuating both of the cams 19 in the brake setting operation, both of the shoes are moved outward bodily with the result that all parts of the shoe coverings are pressed against the drum with equal pressure, thereby causing uniform wearing of the coverings and consequently prolonging the service life thereof. By applying the brake force to the expanding cams as a mechanical couple of forces, the strain is uniformly distributed to all of the operating parts. With the actuating force thus balanced, wear between the elements of the friction clutch and between the driven element and its mounting is reduced to a minimum.

I do not herein claim the specific construction and mounting of the magnetic friction elements, this forming the subject matter of a copending application filed jointly by myself and Albert C. Warner and identified as Serial No. 259,936, filed March 8, 1928.

I claim as my invention:

1. The combination with a vehicle wheel whose motion is to be arrested or controlled, of a drum arranged to rotate with said wheel, a pair of brake shoes within said drum, a pair of rock shafts mounted on diametrically opposite sides of the drum to oscillate on fixed axes, a pair of expanding devices, each associated with one of said rock shafts and adapted to actuate said shoes upon oscillation of its rock shaft in either direction, a friction clutch including an annular driven element of substantially the same diameter as said drum, said element being mounted for movement into frictional engagement with said drum, and a torque multiplying connection between said element and each of said rock shafts comprising a crank on the rock shafts, an arm projecting inwardly from said element, and a link connecting the inner end of said arm with the free end of said crank.

2. The combination with a vehicle wheel whose motion is to be arrested or controlled, of a drum arranged to rotate with said wheel, a pair of shoes within said drum, expanding mechanism for said shoes including a rock shaft mounted near the periphery of said drum and operable to actuate said shoes upon oscillation in either direction from a normal brake-releasing position, a friction clutch including a driving element on the drum, an annular driven element of substantially the same diameter as the drum, and a torque multiplying connection operable to apply the force derived from the movement of said driven element to said rock shaft with a moment arm equal substantially to the radius of said driven element, said connection comprising a radial arm projecting inwardly from said driven element, a crank member on said rock shaft extending parallel to said arm when said rock shaft is in brake-releasing position, and means connecting the inner end of said arm and the free end of said crank member.

3. The combination with a vehicle wheel whose motion is to be arrested or controlled, of a drum arranged to rotate with said wheel, a pair of shoes within said drum, a rock shaft mounted for oscillation on an axis parallel to the drum axis, means on said shaft operable to expand said shoes upon oscillation of said shaft in either direction, a ring adapted for frictional attachment to a part on said drum whereby to rotate with the drum, and a mechanism for applying the force resulting from movement of said ring to said rock shaft with increased leverage, said mechanism including an arm rigid with said ring and projecting inwardly therefrom toward the axis of said drum, a crank member on said rock shaft, and means providing a mechanical connection between the inner end of said arm and the free end of said crank member.

4. The combination with a vehicle wheel whose motion is to be arrested or controlled, of a drum arranged to rotate with said wheel, a pair of shoes within said drum, a rock shaft mounted for oscillation on an axis parallel to the drum axis, means on said shaft operable to expand said shoes upon oscillation of said shaft in either direction, an annular ring adapted for frictional attachment to a part on said drum whereby to rotate with the drum, and a mechanism for applying the force resulting from movement of said ring to said rock shaft with a moment arm substantially equal to the radius of said ring, said mechanism including a plurality of connecting members normally disposed substantially within the circumference of said ring.

5. The combination with a vehicle wheel the motion of which is to be arrested or controlled, of a drum arranged to rotate with said wheel, a pair of shoes mounted within said drum, a pair of devices adapted to expand said shoes against said drum, an electromagnetic friction clutch adapted when energized to cause its driven element to become attached frictionally to said drum, and means for transmitting movement of said driven element as a mechanical couple to said devices.

6. The combination with a vehicle wheel whose motion is to be controlled, of a drum arranged to rotate with the wheel, a pair of shoes within said drum, a pair of expanding devices associated with opposite ends of said shoes and adapted when actuated in either direction to move said shoes against the internal surface of said drum, an annular driving clutch element arranged to rotate with the drum, a rigid annular driven clutch element mounted for frictional engagement with said driving element, an electromagnetic means adapted when energized to cause such engagement, and means providing a mechanical connection between said driven element and each of said expanding devices, said connection being operable to transmit frictional force applied to said driven element to said shoes with increased leverage.

7. The combination with a vehicle wheel whose motion is to be controlled, of a drum arranged to rotate with the wheel, a pair of shoes within said drum, a pair of expanding devices associated with opposite ends of said shoes and adapted when actuated in either direction to move said shoes against the internal surface of said drum, an annular driving clutch element arranged to rotate with the drum, a rigid annular driven clutch element mounted for movement for frictional engagement with said driving element, electromagnetic means adapted when energized to cause such engagement, and two independent mechanisms each mechanically connecting said driven element and one of said expanding devices, said mechanism being operable to transmit the frictional force resulting from engagement between said elements to said expanding devices with increased leverage.

8. The combination with a vehicle wheel whose motion is to be arrested or controlled, of a drum arranged to rotate with said wheel, a pair of shoes mounted within said drum, a pair of expanding devices associated with opposite ends of said shoes and adapted when actuated to move said shoes bodily into braking engagement within said drum, a clutch having a driven element adapted to be moved by electromagnetic action into frictional engagement with said drum, and torque multiplying connections for transmitting the movements of said element to each of said expanding devices.

9. The combination with a revoluble member whose motion is to be arrested or controlled, of gripping means adapted for movement into braking engagement with said member, operating means for said gripping means including a rock shaft arranged for oscillation in either direction from a normal brake-releasing position, a driving clutch element rotatable with said revoluble member, a driven element adapted for frictional engagement with said driving element whereby to rotate therewith, a torque multiplying connection between said driven element and said rock shaft, including a crank on said rock shaft, a pair of oscillatory spring arms acting on said crank near the free end thereof and tending to move said crank in opposite directions, and stationary stops positioned to render each of said spring arms inoperative when said crank is in brake-releasing position.

10. The combination with a revoluble member whose motion is to be arrested or controlled, of gripping means adapted for movement into braking engagement with said member, a mechanism for actuating said gripping means comprising a driving clutch element arranged to rotate with said member, a driven clutch element adapted to be attached frictionally to said driven element, an electromagnet adapted when energized to cause such attachment, torque multiplying means connecting said driven element and said mechanism and arranged to actuate said gripping means upon oscillation of said driven element in either direction, and two individual spring means tending to oscillate said driven element and said connecting means in opposite directions, said spring means operating when said magnet is de-energized to maintain said element and connecting means in brake-releasing position.

11. A brake of the momentum type comprising, in combination, a revoluble drum, braking means movable into frictional engagement with a cylindrical surface of said drum, a pair of actuating devices for said braking means mounted for oscillation about fixed axes disposed on diametrically opposite sides of said drum, a pair of annular friction elements one rotatable with said drum, the other being mounted for oscillation about the drum axis, means operable to cause frictional gripping engagement of said elements, and independent torque multiplying means for actuating said devices connected respectively to said oscillatory element on opposite sides thereof and along a diameter which extends substantially perpendicular to a diameter through the axes of said devices.

12. A brake of the momentum type comprising, in combination, a revoluble drum, braking means movable into frictional engagement with a cylindrical surface of said drum, a pair of actuating devices for said braking means mounted for oscillation about fixed axes disposed on diametrically opposite sides of said drum, a pair of annular friction elements substantially equal in diameter to that of said drum, one rotatable with said drum, the other being mounted for oscillation about the drum axis, means operable to cause frictional gripping engagement of said elements, and independent torque multiplying means for actuating said devices connected respectively to said oscillatory element on opposite sides thereof.

13. A brake of the momentum type comprising, in combination, a revoluble drum, braking means movable into frictional engagement with a cylindrical surface of said drum, a pair of actuating devices for said braking means mounted for oscillation about fixed axes disposed on diametrically opposite sides of said drum, a pair of annular friction elements one rotatable with said drum, the other being mounted for oscillation about the drum axes, and means operable to cause frictional gripping engagement of said elements, each including a link member adapted to be placed under tension and compression respectively in the oscillation of said driven friction element in opposite directions away from brake released position.

14. A brake of the momentum type comprising, in combination, a revoluble drum, braking means movable into frictional engagement with a cylindrical surface of said drum, a pair of annular friction elements substantially equal in diameter to that of said drum, one rotatable with said drum, the other being mounted for rotation about the drum axis, means operable to cause gripping engagement of said elements, and actuating means for said braking means including two members rigidly attached to said oscillatory frictional element on diametrically opposite sides thereof.

15. A brake of the momentum type comprising, in combination, a revoluble drum, braking means movable into frictional engagement with a cylindrical surface of said drum, a pair of annular friction elements substantially equal in diameter to that of said drum, one rotatable with said drum, the other being mounted for rotation about the drum axis, means operable to cause gripping engagement of said elements, an oscillatory actuating device for said braking means, and a torque multiplying connection between said oscillatory element and said device having a plurality of elements whose positions throughout the range of their brake setting movements are confined to the space defined within the periphery of said oscillatory element.

In testimony whereof, I have hereunto affixed my signature.

ADDI BENJAMIN CADMAN.